US012602485B2

(12) United States Patent
Zhang et al.

(10) Patent No.: US 12,602,485 B2
(45) Date of Patent: Apr. 14, 2026

(54) MONITORING SECURITY RISK OF A COMPUTING DEVICE

(71) Applicant: Capital One Services, LLC, McLean, VA (US)

(72) Inventors: Rui Zhang, New York, NY (US); Sudheendra Kumar Kaanugovi, Aldie, VA (US); Jeremy Goodsitt, Champaign, IL (US); Dustin Summers, Lovettsville, VA (US); Austin Walters, Savoy, IL (US)

(73) Assignee: Capital One Services, LLC, McLean, VA (US)

( * ) Notice: Subject to any disclaimer, the term of this patent is extended or adjusted under 35 U.S.C. 154(b) by 454 days.

(21) Appl. No.: 17/945,452

(22) Filed: Sep. 15, 2022

(65) Prior Publication Data

US 2024/0095369 A1     Mar. 21, 2024

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC .......................... G06F 21/577; G06F 2221/034
See application file for complete search history.

(56) References Cited

U.S. PATENT DOCUMENTS

| | | | |
|---|---|---|---|
| 10,278,074 | B1 | 4/2019 | Shen et al. |
| 10,742,676 | B2 | 8/2020 | Mahaffey et al. |
| 10,762,206 | B2 | 9/2020 | Titonis et al. |
| 10,848,515 | B1 * | 11/2020 | Pokhrel ............... H04L 63/1433 |
| 10,873,641 | B2 | 12/2020 | Benson et al. |
| 11,159,943 | B2 | 10/2021 | Shah et al. |
| 2016/0337686 | A1 * | 11/2016 | Maker, III ......... H04N 21/4424 |
| 2018/0069889 | A1 * | 3/2018 | Beale .................. H04L 63/1433 |
| 2019/0108506 | A1 | 4/2019 | Vokes et al. |
| 2020/0007342 | A1 | 1/2020 | Liem et al. |
| 2021/0021592 | A1 | 1/2021 | Wright |
| 2021/0099444 | A1 * | 4/2021 | Nagaraja ............ G06Q 30/0185 |
| 2021/0136100 | A1 * | 5/2021 | Gupta .................. G06F 21/577 |
| 2023/0289604 | A1 * | 9/2023 | Chan ..................... G06F 21/577 |

\* cited by examiner

*Primary Examiner* — Farid Homayounmehr
*Assistant Examiner* — Suman Debnath
(74) *Attorney, Agent, or Firm* — Sterne, Kessler, Goldstein & Fox P.L.L.C.

(57) ABSTRACT

Disclosed herein are system, method, and computer program product embodiments for determining a probability of a device at risk. The device may be associated with a plurality of security parameters. For a security parameter, the device can be in multiple states. A probability value corresponding to a security parameter can indicate the security parameter being in a state among the multiple states. A probabilistic graphical model may be used to represent dependences of the plurality of security parameters. A device security risk prediction module may determine a probability of the device at risk based on the probabilistic graphical model and the probability assignments to the plurality of nodes of the probabilistic graphical model, and further determine a user action instruction to be provided to a user of the device based on the probability of the device at risk.

20 Claims, 5 Drawing Sheets

MONITORING SECURITY RISK OF A COMPUTING DEVICE

BACKGROUND

Electronic commerce and e-government may conduct business by relying on online interactions and transactions between a computing device used by a customer or a user and a server managed by the government or an institution, such as a financial institution. To conduct ecommerce or e-government service, a user can use various computing device such as a personal computer, laptop, tablet, smart phone, etc. to interact with a website hosted by the server managed by the government or the institution. The computing device used by the user may be at security risk to be compromised.

BRIEF SUMMARY

Disclosed herein are system, apparatus, device, method and/or computer program product embodiments, and/or combinations and sub-combinations thereof for determining a probability of a device at risk. The device may be associated with a plurality of security parameters. For a security parameter, the device can be in multiple states, such as a secure state or a non-secure state. There may be a probability value corresponding to a security parameter to indicate the security parameter being in a state among the multiple states. A probabilistic graphical model may be used to represent dependences of the plurality of security parameters. The probabilistic graphical model can include a plurality of nodes, and probability assignments to the plurality of nodes representing dependences of the plurality of security parameters based on the plurality of probability values corresponding to the plurality of security parameters. A device security risk prediction module may be operated by the device or a processor of the device. The device security risk prediction module may determine a probability of the device at risk based on the probabilistic graphical model and the probability assignments to the plurality of nodes of the probabilistic graphical model, and further determine a user action instruction to be provided to a user of the device based on the probability of the device at risk. A computing device or a device are used interchangeably in the current disclosure.

In some examples, a device can include a memory and a processor coupled to the memory. The memory can store a plurality of probability values corresponding to a plurality of security parameters of a device, where a probability value indicates a security parameter being in a state among two or more states. A device security risk prediction module can be operated by the processor, and configured to determine a structure of a probabilistic graphical model including a plurality of nodes, and probability assignments to the plurality of nodes representing dependences of the plurality of security parameters based on the plurality of probability values corresponding to the plurality of security parameters. In addition, the device security risk prediction module can be configured to determine a probability of the device at risk based on the probabilistic graphical model and the probability assignments to the plurality of nodes of the probabilistic graphical model; and further determine a user action instruction to be provided to a user of the device based on the probability of the device at risk.

Descriptions provided in the summary section represent only examples of the embodiments. Other embodiments in the disclosure may provide varying scopes different from the description in the summary. In some examples, systems and computer program products of the disclosed embodiments may include a computer-readable device storing computer instructions for any of the methods disclosed herein or one or more processors configured to read instructions from the computer readable device to perform any of the methods disclosed herein.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Electronic commerce and e-government services may be conducted based on online interactions and transactions between a computing device used by a customer or a user and a server managed by the government or an institution, such as a financial institution. However, the computing device used by the user may be at security risk to be compromised, leading to the server being compromised as well. It is vital for financial institutions to monitor the security risks of a device, in order to protect customer data and to preempt attacks originated from the compromised devices used by the customers or users. Based on the determined risk level of the devices, institutions can take preventative actions such as preventing customers from logging into their applications to access data or information stored in the server managed by the institutions. Presently, to assess the risk level of the device, manual methods or heuristic methods are used to examine the security parameters associated with the device, such as whether there is a malware presented on the user device. Such a manual or heuristic process can be inaccurate and hard to scale up to a large number of devices.

Embodiments herein present techniques based on a probabilistic graphical model, such as Bayesian networks or Markov networks to automatically and more accurately determine the risk level of a device. A probabilistic graphical model can capture the dependencies between various risk factors or security parameters of the device, and can determine systemically the risk level of the device. Since many security parameters are binary, embodiments herein can have improved and manageable complexity in predicting the risk level of a device. Security parameters of the device may be referred to as risk factors, health signals, or other terms known to one having ordinary skill in the art.

In some embodiments, a node in a probabilistic graphical model can correspond to one of a variety of risk factors including a security parameter or risk factor corresponding to a status of a software component or a hardware component of the device. A probability value assigned to the node can indicate a probability value of the software component or the hardware component being in a secure state. The probabilistic graphical model can present an overall big picture to determine a probability of the device at risk based on all the security parameters. In some embodiments, a hidden causality among the plurality of nodes of the probabilistic graphical model can be represented and determined by machine learning, which would not be possible to be discovered if the manual methods or heuristic methods are used. Accordingly, embodiments herein provide improved security to an online transaction system by more accurately predicting the probability of the device at risk.

Figure 1:
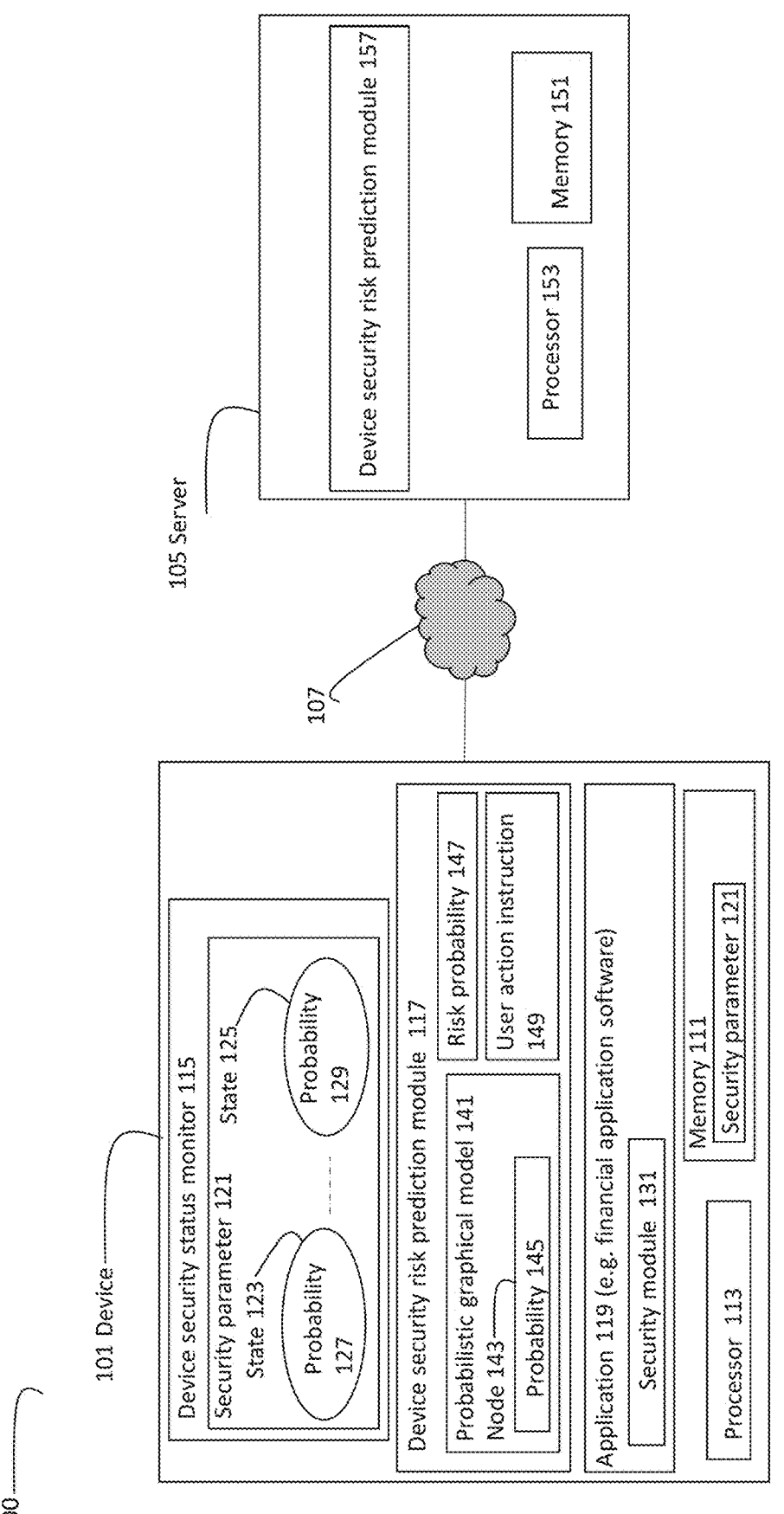
FIG. 1 is a block diagram of a system, according to some embodiments.

FIG. 1 is a block diagram of a system 100, according to some embodiments. For example, system 100 can be used to determine a probability of a device 101 at risk based on a probabilistic graphical model 141 and probability assignments to the nodes of probabilistic graphical model 141. It is to be understood that there may be more or fewer components included in system 100. Further, it is to be understood that one or more of the devices and components within system 100 may include additional and/or varying features from the description below, and may include any devices and components that one having ordinary skill in the art would consider and/or refer to in designing a system to determine a probability of a device at risk based on a probabilistic graphical model.

In some embodiments, system 100 can include device 101 and a server 105 operatively coupled to each other through a network 107. In some embodiments, device 101 can include a memory 111 and a processor 113 coupled to memory 111. Similarly, server 105 can also include a memory 151 and a processor 153 coupled to memory 151. Various modules, which can be implemented as hardware, software, or a combination of hardware and software can be operated on device 101 or server 105. In some embodiments, a device security status monitor 115, a device security risk prediction module 117, and an application 119 can be operated on device 101. In addition, a device security risk prediction module 157 can be operated on server 105, which can perform similar function as device security risk prediction module 117.

In some embodiments, network 107 can be a "computer network" or a "communication network," which are used interchangeably. In some examples, network 107 can include an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

In some embodiments, device 101 can be a wireless communication device, a smart phone, a laptop, a tablet, a personal assistant, a monitor, a wearable device, an Internet of Thing (IoT) device, a mobile station, a subscriber station, a remote terminal, a wireless terminal, or any other user device. In some other examples, device 101 can be a desktop workstation, a server, and/or embedded system, communicatively coupled to server 105 by wired lines, or any combination thereof. Device 101 can also be configured to operate based on a wide variety of wireless communication techniques. These techniques can include, but are not limited to, techniques based on 3rd Generation Partnership Project (3GPP) standards. In some examples, device 101 can include various components, such as a processor, an operating system, a camera, a storage device coupled to the processor.

In some embodiments, server 105 can include a server device (e.g., a host server, a web server, an application server, etc.), a data center device, or a similar device. Server 105 can include a processor, an operating system, server applications operated by the processor, and a storage device coupled to the processor. The processor of server 105 can include one or more central processing units (CPUs), and a programmable device (such as a hardware accelerator or a FPGA).

In some embodiments, memory 111 can store a plurality of security parameters of device 101, e.g., security parameter 121. Security parameter 121 can include a security parameter corresponding to a status of a software component or a hardware component of device 101, about a user, or other relevant factors. In some examples, security parameter 121 can include a parameter to indicate whether a malware presents on device 101, a parameter to indicate whether device 101 is currently being debugged, a parameter to indicate whether device 101 is rooted or jailbroken, a parameter to indicate whether an application is an unauthorized copy version of an authorized copy of the application, a parameter to indicate whether a last known customer installation location is different from the current installation location, a parameter to indicate whether a keyboard is detected, a parameter to indicate whether device 101 is being re-engineered, a parameter to indicate whether an application is running on an emulator or a virtual environment, a parameter to indicate whether a user has a malware detection capability disabled, or a parameter to indicate whether the user runs on a custom ROM device. There can be many other security parameter corresponding to a status of a software component, a hardware component of device 101, or a user, which are not listed herein.

In some embodiments, security parameter 121 can be in a first state 123 or a second state 125. The first state 123 can be a "secure" state, and the second state 125 can be a "non-secure" state for security parameter 121. In some other examples, there can be more than two states to indicate various levels of security for security parameter 121.

In some embodiments, a probability value 127 can indicate the probability for security parameter 121 to be in the first state 123, while a probability value 129 can indicate the probability for security parameter 121 to be in the second state 125. In general, the probability value indicates a security parameter being in a state among two or more states. In some examples, probability value 127 can be a probability value of a software component or a hardware component of device 101 being in a secure state. If there are only two states, the first state 123 and the second state 125, the probability value 127 and the probability value 129 would have a sum of 1. In some other examples, there can be more than two states, and each state has a corresponding probability value. The total sum of all the probability values for all the states has a value 1.

In some embodiments, a plurality of probability values can correspond to a plurality of security parameters of device 101. In some examples, device security status monitor 115 can collect data and determine the plurality of probability values, e.g., probability value 127, probability value 129 corresponding to the plurality of security parameters, e.g., security parameter 121.

In some embodiments, device security risk prediction module 117 can determine a structure of a probabilistic graphical model 141, which includes a plurality of nodes, e.g., a node 143. Each node can represent a security parameter. A probability 145 can be assigned to node 143, representing dependences of the plurality of security parameters based on the plurality of probability values corresponding to the plurality of security parameters. In some examples, node 143 can represent security parameter 121, while probability 145 is assigned based on probability value 127 or probability value 129.

Figure 2:
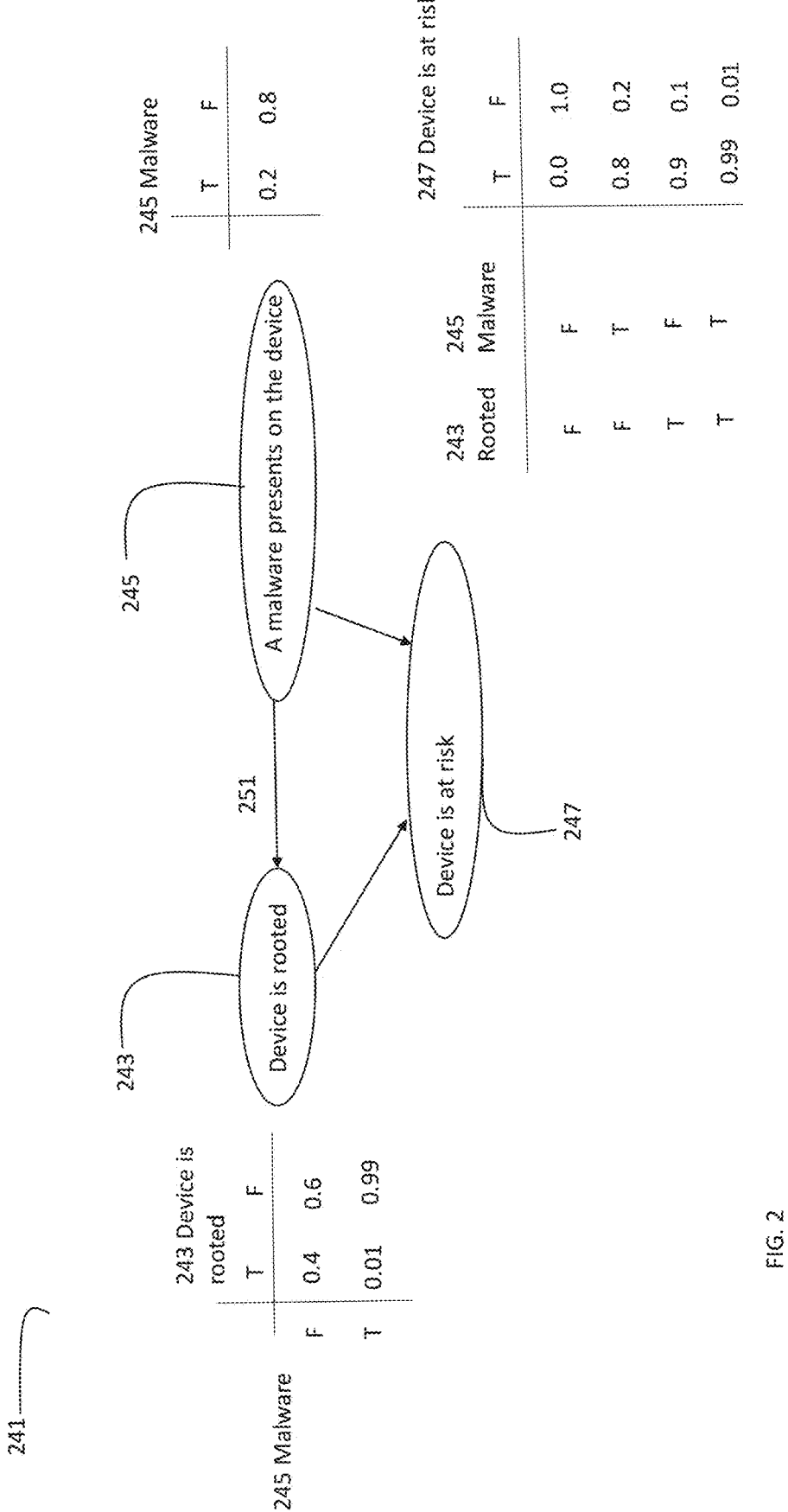
FIGS. 2-3 illustrate example probabilistic graphical models, according to some embodiments.
Figure 3:
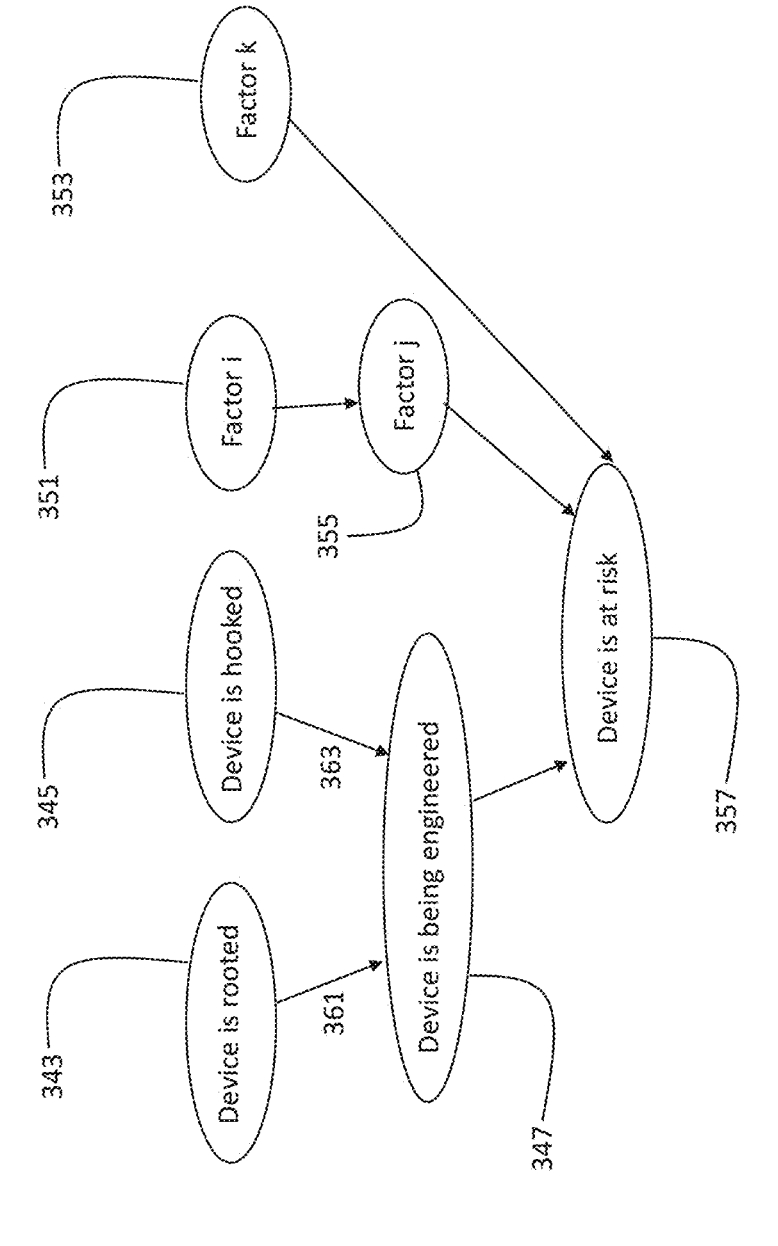

In some embodiments, probabilistic graphical model 141 can be a Bayesian network. The structure of probabilistic graphical model 141 can include a directed and acyclic graph, as shown in FIGS. 2-3. In some examples, the directed and acyclic graph can include a node represents a security parameter that is not directly observable by the user. The directed and acyclic graph can include a hidden causality among the plurality of nodes of the directed and acyclic graph, where the hidden causality can be determined by machine learning. In some examples, the probabilistic graphical model 141 can include a Markov network, and the structure of the probabilistic graphical model includes an undirected and cyclic graph.

In some examples, device security risk prediction module 117 can determine a risk probability 147 of device 101 at risk based on probabilistic graphical model 141 and the probability assignments to the plurality of nodes of the probabilistic graphical model. Based on risk probability 147, device security risk prediction module 117 can determine a user action instruction 149 to be provided to a user of the device. In some examples, user action instruction 149 can include an action instruction to prevent the user from login to application 119. The application 119 may have a security module 131 in communication with device security risk prediction module 117, where the user action instruction 149 can be generated by device security risk prediction module 117 and sent to security module 131 of application 119 to be provided to the user of the device or the user of application 119. In some examples, application 119 may perform various ecommerce functions or other services. In some examples, application 119 may be a financial application software that communicates with server 105.

In some other embodiments, part or all of functions for device security risk prediction module 117 described above can be implemented on server 105 as device security risk prediction module 157. In some embodiments, device security risk prediction module 157 and device security risk prediction module 117 can be coordinated to perform the functions described above. Many different implementation options can be developed for device security risk prediction module 157 and device security risk prediction module 117, which are known to one having ordinary skills in the art.

FIGS. 2-3 illustrate example probabilistic graphical models, a probabilistic graphical model 241, and a probabilistic graphical model 341, according to some embodiments. Probabilistic graphical model 241 and probabilistic graphical model 341 are examples of probabilistic graphical model 141.

In some embodiments, as shown in FIG. 2, probabilistic graphical model 241 can include a node 243, a node 245, and a node 247. Node 243 can represent a security parameter to indicate whether device 101 is rooted or not, node 245 can represent a security parameter to indicate whether a malware presents on device 101, while node 247 can indicate a probability of device 101 at risk or not. Device security risk prediction module 117 can derive a probability value for node 247 representing the probability of device 101 at risk based on operations described herein in addition to techniques known to one having ordinary skills in the art.

In some embodiments, probabilistic graphical model 241 can be a Bayesian network (also known as a Bayes network, Bayes net, belief network, or decision network) representing a set of parameters and their conditional dependencies via a directed acyclic graph (DAG) including nodes and directed edges. Bayesian networks are ideal for taking an event that occurred and predicting the likelihood that any one of several possible known causes was the contributing factor.

In some embodiments, node 245 can be in two different states, a first state T (for true) indicating there is a malware on device 101, and F (for false) indicating there is no malware on device 101. The meaning of the state can be assigned differently. For example, the first state T (for true) can indicate there is no malware on device 101, and F (for false) can indicate there is a malware on device 101. A directed edge 251 from node 245 to node 243 can indicate that the security parameter associated with node 245, which indicates whether a malware presents on device 101, can have an impact on the security parameter indicating whether the device is rooted at node 243. A probability value 0.2 can be assigned to node 245 to indicate the probability for node 245 to be in T state is 0.2, which implies the probability for node 245 to be in F state is 0.8, where the total probability is 0.2+0.8=1.

In some embodiments, node 243 can be in two different states, a first state T (for true) indicating device 101 is rooted, and F indicating device 101 is not rooted. Similarly, node 247 can be in two different states, a first state T (for true) indicating device 101 is at risk, and F indicating device 101 is not at risk. Various calculation can be performed, e.g., calculations based on conditional probability, to derive the probability of device 101 at risk, such as the probabilities shown in the truth table of FIG. 2, based on the probabilistic graphical model 241 and the probability assignments to node 245 and node 243.

In some embodiments, a Markov chain, a Markov process, or a Markov network can be used for probabilistic graphical model 241 instead of the Bayesian network shown in FIG. 2. In a Markov network, the structure of the probabilistic graphical model can include an undirected and cyclic graph, different from the directed and acyclic graph used in the Bayesian network. One having ordinary skills in the art would easily carry out the calculations in a similar fashion described above for the Bayesian network.

In some embodiments, as shown in FIG. 3, probabilistic graphical model 341 can be a directed and acyclic graph including a node 343, a node 345, a node 351, a node 353, a node 347, a node 355, and a node 357. Node 343 can represent a security parameter to indicate whether device 101 is rooted or not, node 345 can represent a security parameter to indicate whether device 101 is hooked or not, node 347 can represent a security parameter to indicate whether device 101 is being engineered or not, and node 357 can represent a probability of device 101 at risk or not. In addition, node 351, node 353, and node 355 can represent other security factors without showing the details. Device security risk prediction module 117 can derive a probability value for node 357 representing the probability of device 101 at risk based on operations described herein in addition to techniques known to one having ordinary skills in the art.

In some embodiments, the security parameters represented by node 343 and node 345 can be observable by a user or an application, such as through the use of application 119. For example, by using application 119, server 105 can detect information about hardware component for device 101, or information about software for device 101. In some embodiments, the security parameter represented by node 347, which indicates whether device 101 is being engineered or not, can be a security parameter that is not directly observable by the user. Accordingly, edge 361 from node 343 to node 347, and edge 363 from node 345 to node 347 can represent a hidden causality among node 343, node 345, and node 347. The hidden causality among node 343, node 345, and node 347 may not be observable by the user of device 101. Accordingly, such a hidden causality would not be able to be discovered by the manual method or heuristic method in predicting the risk level of device 101. However, the hidden causality can be derived from other data about other devices collected by server 105 or other tools, such as using machine learning techniques, and represented by probabilistic graphical model 341. Therefore, embodiments herein present techniques that improve the current computing system with improved security.

Figure 4:
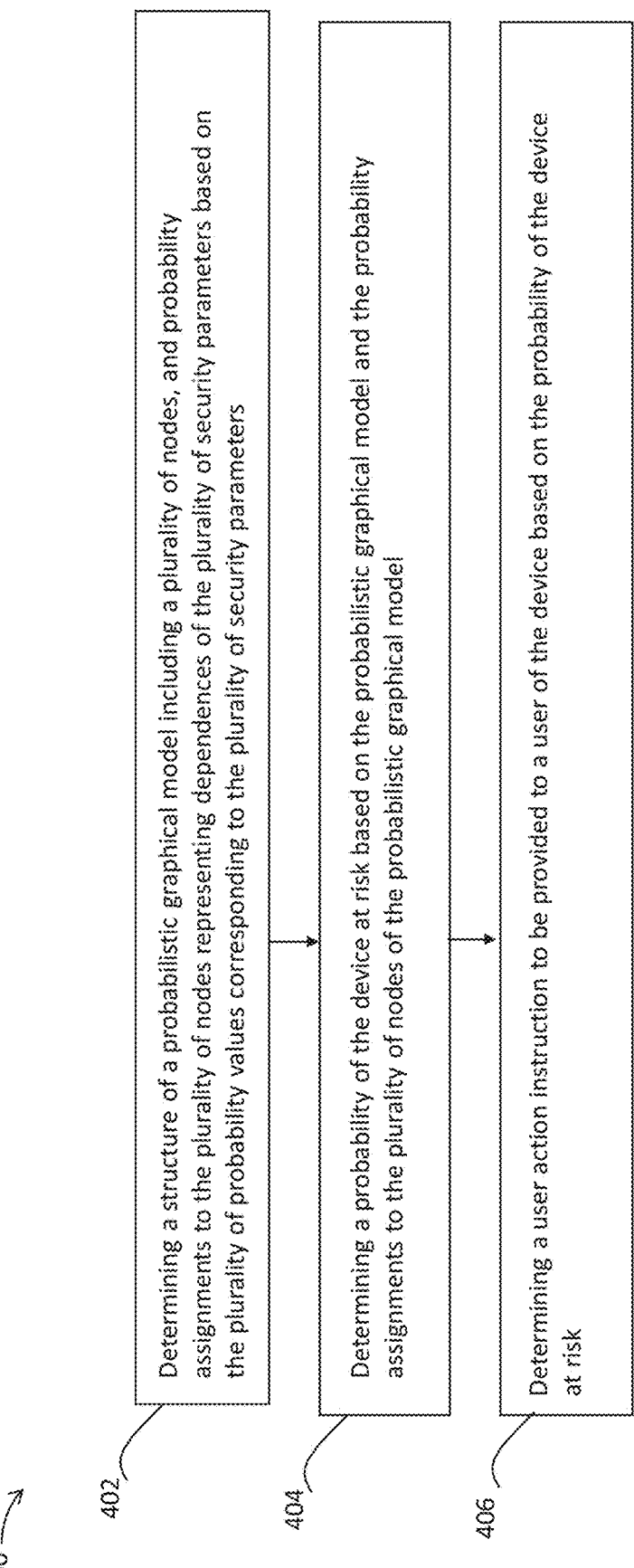
FIG. 4 illustrates an example process, according to some embodiments.

FIG. 4 illustrates an example process, e.g., process 400, according to some embodiments. For example, process 400 may be implemented by device security risk prediction module 117. In some embodiments, process 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

In operation 402, device security risk prediction module 117 can determine a structure of a probabilistic graphical model including a plurality of nodes, and probability assignments to the plurality of nodes representing dependences of the plurality of security parameters based on the plurality of probability values corresponding to the plurality of security parameters. For example, as shown in FIG. 1, device security risk prediction module 117 can determine a structure of probabilistic graphical model 141, probabilistic graphical model 241, or probabilistic graphical model 341. Probabilistic graphical model 141 can include a plurality of nodes, e.g., node 143, and probability assignments to the plurality of nodes representing dependences of the plurality of security parameters based on the plurality of probability values corresponding to the plurality of security parameters. Similarly, probabilistic graphical model 241 can include a plurality of nodes, e.g., node 243, node 245, and node 247, and probability assignments to the plurality of nodes representing dependences of the plurality of security parameters based on the plurality of probability values corresponding to the plurality of security parameters.

In operation 404, device security risk prediction module 117 can determine a probability of the device at risk based on the probabilistic graphical model and the probability assignments to the plurality of nodes of the probabilistic graphical model. For example, as shown in FIG. 2, device security risk prediction module 117 can determine a probability of device 101 at risk based on the probabilistic graphical model 241 and the probability assignments to node 245, node 243 of probabilistic graphical model 241. The probability of device 101 at risk may be a probability calculated at node 247 based on the probability assignments at node 245 and node 243. For example, to determine the risk probability at node 247, when node 245 is at state F, node 243 is at state F, the probability of device 101 at risk is 0. On the other hand, when node 245 is at state T, node 243 is at state T, the probability of device 101 at risk is 0.99. In general, state T denotes "true" and state F denotes "false", A may denote the malware node 245, B may denote the rooted node 243, C may denote the at risk node 247. A generic example may compute the risk probability P(C|A=T) based on some probability formula. Note that P(C,B|A) P(A)=P(C|B,A)P(B|A)P(A)=P(A,B,C), it follows P(C,B=P(C|B,A)P(B|A) and P(C,B|A=T)=P(C|B,A=T)P (B|A=T). Summing over all possible states of B with respect to P(C,B|A=T) will derive P(C|A=T): P(C|A=T)=P(C, B=T|A=T)+P(C, B=F|A=T)=P(C|A=T, B=T) P(B=T|A=T)+P(C|A=T, B=F) P(B=F|A=T). In some embodiments, the probability P(C|A=T) may be normalized to ensure it adds up to 1.

In operation 406, device security risk prediction module 117 can determine a user action instruction to be provided to a user of the device based on the probability of the device at risk. For example, as shown in FIG. 1, device security risk prediction module 117 can determine user action instruction 149 to be provided to a user of the device based on the probability of the device at risk. In some embodiments, user action instruction 149 can include an action instruction to prevent the user from login to application 119 when device security risk prediction module 117 determines the probability of device 101 at risk is high, e.g., larger than 0.9. In some embodiments, user action instruction 149 can include an action instruction to ask the user to provide additional credential information for validation before allowing the user to login to application 119, when device security risk prediction module 117 determines the probability of device 101 at risk is in a middle range, e.g., less than 0.9 but larger than 0.1. In some embodiments, user action instruction 149 can include an action instruction to allow the user to login to application 119 as normal when device security risk prediction module 117 determines the probability of device 101 at risk is low, e.g., less than 0.1. User action instruction 149 can be generated by device security risk prediction module 117 or security module 131 within application 119.

Figure 5:
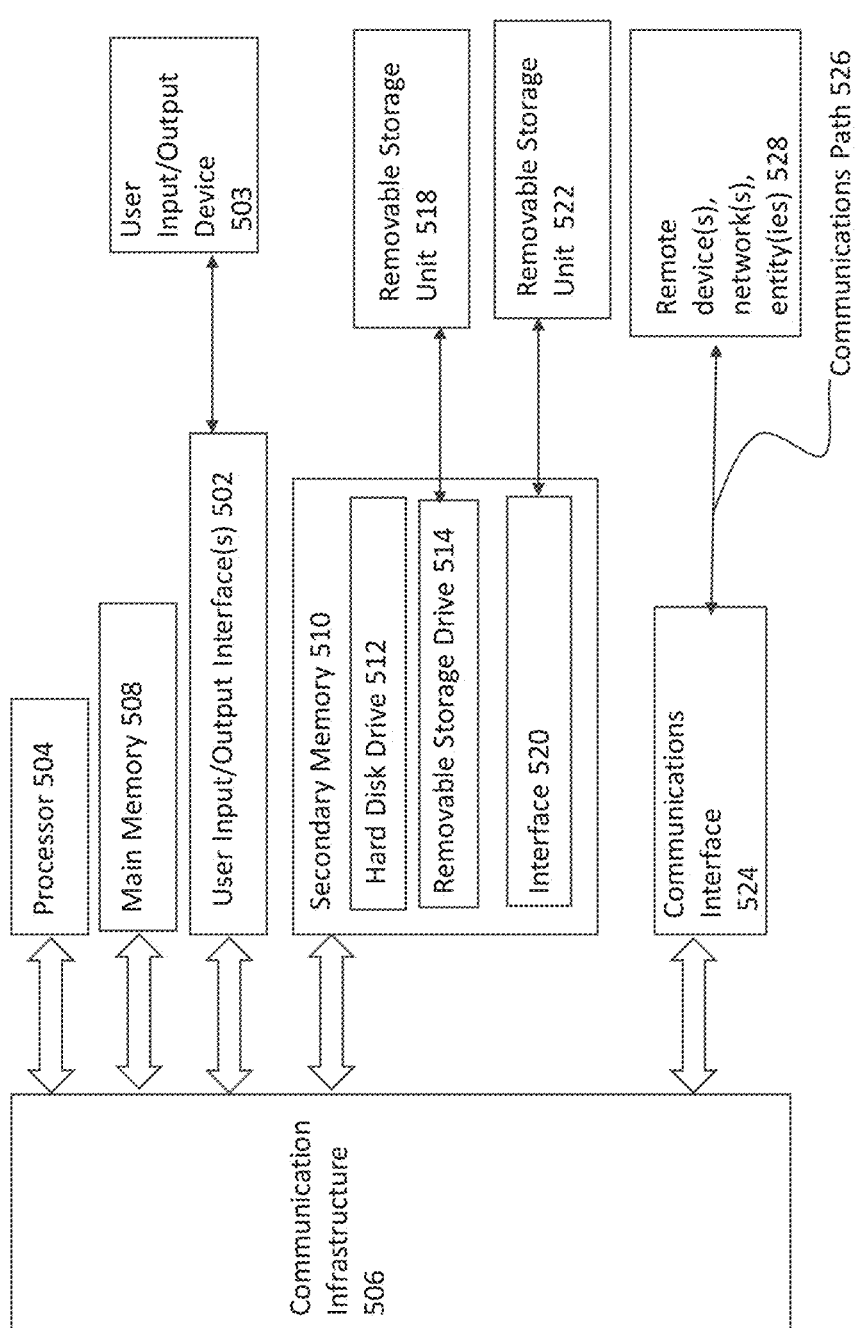
FIG. 5 is an example computer system useful for implementing various embodiments.

FIG. 5 shows a computer system 500, according to some embodiments. Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof. In some examples, computer system 500 can be used to implement device 101 or server 105 as shown in FIG. 1, or operations shown in FIGS. 2-4. Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein. For example, control logic may cause processor 504 to perform operations shown in FIGS. 2-4.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections may set forth one or more but not all exemplary embodiments of the present description as contemplated by the inventor(s), and thus, are not intended to limit the present description and the appended claims in any way.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A computing device, comprising:
a memory configured to store a plurality of probability values corresponding to a plurality of security parameters of a device, wherein a first probability value of the plurality of probability values indicates a first security parameter of the plurality of security parameters being in a first state and a second probability value of the plurality of probability values indicates a second security parameter of the plurality of security parameters being in a second state;
a processor coupled to the memory; and
a device security risk prediction module operated by the processor, and configured to:
determine a structure of a probabilistic graphical model including a plurality of nodes, wherein a first node of the plurality of nodes corresponds to the first security parameter and is assigned the first probability value and a second node of the plurality of nodes corresponds to the second security parameter and is assigned the second probability value, and wherein the probabilistic graphical model represents dependences of the plurality of security parameters;
determine a probability of the device at risk based on the probabilistic graphical model and the plurality of probability values assigned to the plurality of nodes of the probabilistic graphical model;
determine a user action instruction based on the probability of the device at risk; and
provide the user action instruction to the device.

2. The computing device of claim 1, wherein the plurality of security parameters of the device includes a security parameter corresponding to a status of a software component or a hardware component of the device.

3. The computing device of claim 2, wherein the plurality of probability values corresponding to the plurality of security parameters includes a probability value of the software component or the hardware component being in a secure state.

4. The computing device of claim 2, wherein the first security parameter indicates whether a malware presents on the device, wherein the second security parameter indicates whether the device is currently being debugged, and wherein the plurality of security parameters further includes at least one of a third security parameter to indicate whether the device is rooted or jailbroken, a fourth security parameter to indicate whether an application is an unauthorized copy version of an authorized copy of the application, a fifth security parameter to indicate whether a keyboard is detected, a sixth security parameter to indicate whether the device is being re-engineered, a seventh security parameter to indicate whether an application is running on an emulator or a virtual environment, an eighth security parameter to indicate whether a user has a malware detection capability disabled, or a security ninth parameter to indicate whether the user runs on a custom ROM device.

5. The computing device of claim 1, wherein the device is the computing device, and the computing device further includes a device security status monitor to collect the plurality of probability values corresponding to the plurality of security parameters of the computing device.

6. The computing device of claim 5, wherein the device is the computing device, and the computing device further includes an application operated on the computing device, and the user action instruction includes an action instruction to prevent a user from login to the application operated on the computing device.

7. The computing device of claim 1, wherein the probabilistic graphical model includes a Bayesian network, and the structure of the probabilistic graphical model includes a directed and acyclic graph.

8. The computing device of claim 7, wherein the directed and acyclic graph includes a node that represents a security parameter that is not directly observable by a user.

9. The computing device of claim 7, wherein the directed and acyclic graph includes a hidden causality among the plurality of nodes of the directed and acyclic graph, and wherein the hidden causality is determined by machine learning.

10. The computing device of claim 1, wherein the probabilistic graphical model includes a Markov network, and the structure of the probabilistic graphical model includes an undirected and cyclic graph.

11. A computer-implemented method for a computing device, the method comprising:
determining a structure of a probabilistic graphical model including a plurality of nodes, wherein a first node of the plurality of nodes corresponds to a first security parameter of a plurality of security parameters of a device and a second node of the plurality of nodes corresponds to a second security parameter of the plurality of security parameters, wherein the first node is assigned a first probability value of a plurality of probability values and the second node is assigned a second probability value of the plurality of probability values, wherein the probabilistic graphical model represents dependences of the plurality of security parameters of the device, and wherein the first probability value indicates the first security parameter being in a first state and the second probability value indicates the second security parameter being in a second state;

determining a probability of the device at risk based on the probabilistic graphical model and the plurality of probability values assigned to the plurality of nodes of the probabilistic graphical model;

determining a user action instruction based on the probability of the device at risk; and provide the user action instruction to the device.

12. The method of claim 11, further comprising:

collecting the plurality of probability values corresponding to the plurality of security parameters of the device.

13. The method of claim 11, wherein the determining the user action instruction comprises:

determining an action instruction to prevent a user from login to an application operated on the device.

14. The method of claim 11, wherein the determining the structure of the probabilistic graphical model comprises:

determining the probabilistic graphical model includes a Bayesian network, and the structure of the probabilistic graphical model includes a directed and acyclic graph.

15. The method of claim 14, wherein the determining the structure of the probabilistic graphical model comprises:

determining the directed and acyclic graph includes a node that represents a security parameter that is not directly observable by a user.

16. The method of claim 11, wherein the determining the structure of the probabilistic graphical model comprises:

determining the probabilistic graphical model includes a Markov network, and the structure of the probabilistic graphical model includes an undirected and cyclic graph.

17. A non-transitory computer-readable medium storing instructions, the instructions, when executed by a processor, cause the processor to perform operations comprising:

determining a structure of a probabilistic graphical model including a plurality of nodes, wherein a first node of the plurality of nodes corresponds to a first security parameter of a plurality of security parameters of a device and a second node of the plurality nodes corresponds to a second security parameter of the plurality of security parameters, wherein the first node is assigned a first probability value of a plurality of probability values and the second node is assigned a second probability value of the plurality of probability values, wherein the probabilistic graphical model represents dependences of the plurality of security parameters of the device, and wherein the first probability value indicates the first security parameter being in a first state and the second probability value indicates the second security parameter being in a second state;

determining a probability of the device at risk based on the probabilistic graphical model and the plurality of probability values assigned to the plurality of nodes of the probabilistic graphical model;

determining a user action instruction based on the probability of the device at risk; and providing the user action instruction to the device.

18. The non-transitory computer-readable medium of claim 17, further comprises:

collecting the plurality of probability values corresponding to the plurality of security parameters of the device.

19. The non-transitory computer-readable medium of claim 17, wherein the determining the user action instruction comprises:

determining an action instruction to prevent a user from login to an application operated on the device.

20. The non-transitory computer-readable medium of 17, wherein the determining the structure of the probabilistic graphical model comprises:

determining the probabilistic graphical model includes a Bayesian network, and the structure of the probabilistic graphical model includes a directed and acyclic graph.

* * * * *